United States Patent Office 3,326,710
Patented June 20, 1967

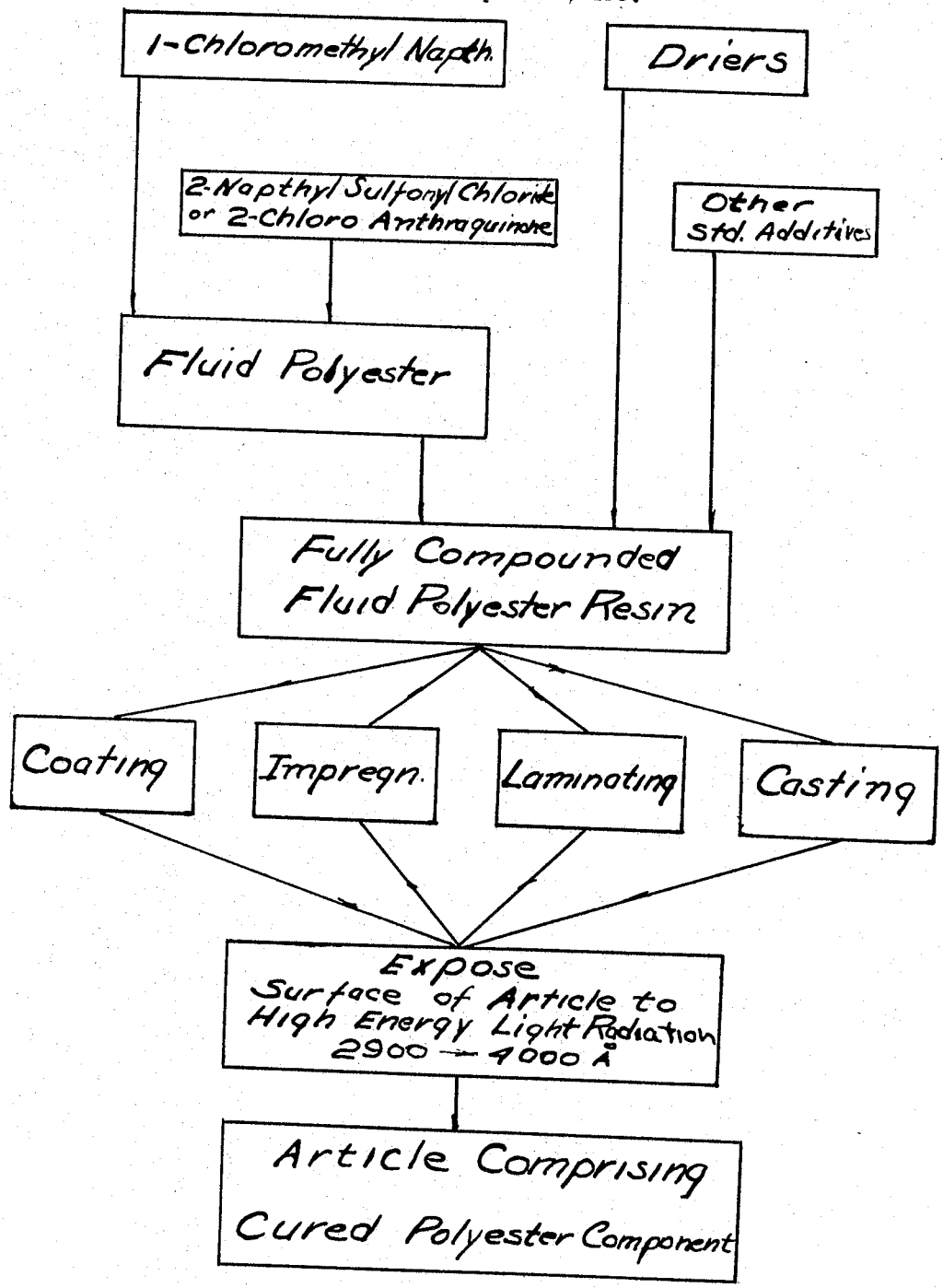

3,326,710
METHOD OF CURING POLYESTER COMPOSITIONS AND COATINGS CONTAINING SYNERGISTIC COMBINATION OF PHOTOSENSITIZERS AND COMPOSITIONS THEREOF
Mary G. Brodie, Chicago, Ill., assignor to The Sherwin-Williams Company, Cleveland, Ohio, a corporation of Ohio
Filed Apr. 16, 1964, Ser. No. 360,403
7 Claims. (Cl. 117—62)

ABSTRACT OF THE DISCLOSURE

The invention discloses that air drying polyesters (non-air inhibited) can be cured more rapidly with light energy within the 2900 to 4000 angstrom range by use of less than 3% of a photosensitizer including 1-chloromethyl naphthalene (25–98%) with the remainder either 2-naphthalene sulfonyl chloride or 2-chloroanthraquinone, which provide a synergistic combination in said polyester.

---

This invention relates to unsaturated polyester resin films and to methods of curing or hardening them at low temperatures under the influence of light energy.

More specifically, this invention relates to a method of preparing unsaturated polyester resin films that may be readily photopolymerized by including admixed therewith a synergistic combination of photopolymerizing sensitizers to provide improved curing and to methods whereby films of the unsaturated polyester resins thus catalyzed may be employed as coatings that have shortened curing cycles under light radiation, have good appearance, and are hard and tough.

The polyester resins of this invention are commonly called or commonly referred to as unsaturated polyester resins. That is, there is ethylenic unsaturation in the polyester molecules. Unsaturated polyester resins, as normally used in practical coatings application, are reduced with vinyl monomers which serve initially to reduce viscosity for purposes of application to substrates. In its end use, the resin-monomer mixture is cured to form a hard, infusible product by copolymerizing the polyester polymer with the vinyl monomer through a vinyl addition reaction. The unsaturated groups within the polyester molecule which cross link with the vinyl monomer blended therewith are most often introduced in the polyester polymer structure by employing an alpha unsaturated alpha beta dicarboxylic acid as at least a portion of the dicarboxylic acid component of the original reactants selected to form the unsaturated polyester. The other monomeric component thereof is most often a saturated monohydric or dihydric alcohol(s) with which the dicarboxylic acid is polymerized in an esterification reaction. One may also introduce unsaturation in such polyesters by employing unsaturated monohydric or dihydric alcohol(s) in the polyester formulation, for example the allyl ethers of pentaerythritol or trimethylolpropane, allyl glycerol ether, allyl glycidyl ether, etc. The term unsaturated polyester resin as used herein refers to the art-recognized combination described of unsaturated resin plus vinyl monomer.

Unsaturated polyesters are used extensively in the production of molded and laminated products. Fiberglass in various form such as cloth, mat, or chopped fiber is often employed in moulding and lamination to reinforce polyester products. Pigmentary fillers or extenders, illustratively fibrous talc, may be used alone or in conjunction with fiberglass reinforcement.

The drawing illustrates a flow sheet which may be helpful in understanding the nature of the invention.

Other practical uses of unsaturated polyesters include potting compounds, insulating varnishes, and protective and decorative coatings. In the latter application, air inhibition of cure of the surface of films has been a most serious problem causing undercured, tacky surfaces whenever polyester surfaces have been exposed to air during curing. This problem has been largely solved with the development of air-drying polyesters which are not air inhibited. Another basic deterrent to use of polyesters in the coatings field has been the difficulty of obtaining a fast cure of films at low temperatures, particularly as required for finishing wood surfaces and other heat sensitive substrates.

Often in the finishing of wood it is desirable to have a coating that provides optical depth as well as toughness. Clear coatings for fine furniture and the like which provide maximum protection to wooden surfaces and also provide an attractive appearance because of optical depth are best obtained with thicker coating films. The application of heavy finishes is often costly when conventional coating materials such as lacquer, varnish, etc. are used because they contain considerable amounts of volatile solvents and therefore, require several separate applications to build up sufficient film thickness. When polyesters are used in place of conventional coatings, a heavy coating may be applied economically in one application. Polyesters require no volatile solvents so that substantially all the deposited wet film is utilized in the final cured coating. Up to 12 mils or greater of polyester coating may be applied in one application by any conventional method, e.g., spray, curtain coater, dip, etc.

The development of unsaturated polyester resin coatings which cure quickly with little or no heating has been only partly successful using inhibitors and stabilizers to prevent premature gellation in conjunction with prior art peroxide catalyst systems. As hereinafter shown, there are disadvantages and limitations to this technique, especially with respect to the attainment of the aforementioned objects. However, photopolymerization with the aid of light sensitive catalysts or photosensitizers, as used in this invention, provides a method whereby such prior art disadvantages and limitations are substantially overcome.

Generally, photosensitizers vary in their effectiveness with different monomer systems and individual photosensitizers are often deficient in one or more desirable properties. It is desirable to employ a photosensitizer which is colorless, light stable, of good solubility in volatile organic solvents, of low chain transfer constant, and capable of dissociation with high quantum efficiency.

The efficiency of a photosensitizer for present purposes is determined by the elapsed time of exposure to light, under otherwise comparable conditions required to set or cure the catalyzed polyester resin. The quality of the cured film is evaluated by the final properties of the film such as hardness, color, abrasion resistance, etc.

It is an object of the present invention in its broadest aspect to provide a more efficient method of photopolymerizing an air drying unsaturated polyester resin by intimately mixing with said polyester resin a catalytic amount of a photosensitizer comprising a mixture of 1-chloromethylnaphthalene and a material selected from the group consisting of 2-naphthalene sulfonyl chloride and 2-chloroanthraquinone and irradiating the polyester resin-photosensitizer mixture with light radiation until the polyester resin becomes cured.

It is a further object of this invention to provide a method of use of air drying unsaturated polyester resins in finishing wood and various other substrates; to provide a method of curing with but little or no heating, requiring a shortened curing cycle so that the entire finishing operation can be carried out economically commercially.

Air drying unsaturated polyesters which are employed in this invention with photosensitizers to produce polyester coatings are specially modified to prevent air inhibition of cure. One method provides for replacing a portion of the conventional reactants with reactants having allyl group containing substituents. Air drying polyesters substantially free from air inhibition are described, for example, in U.S. patents 3,006,878 and 2,852,487. The allylic groups are an essential component of the polyester because they serve to actively prevent the inhibiting action of atmospheric oxygen which is normally dissolved at the surface of films of polyester exposed to air. Allyl groups may be introduced into the polyester itself by employing as ingredients in the polyester formulation, allyl ether type compounds or compounds containing allyl groups without ether linkages such as tetrahydrophthalic anhydride and nadic anhydride ($\Delta^4$endomethylene tetrahydrophthalic anhydride).

Allyl ethers useful in the preparation of unsaturated polyesters for the purpose of incorporating allyl substituent groups in the polyester molecule include monohydric and/or polyhydric ether derivatives of polyhydric alcohols and allyl glycidyl ether. These compounds may be substituted for from 5 to 50% of the glycol equivalents in an unsaturated polyester formulation depending to a certain extent upon the number of allyl groups per mole of the particular allyl ether(s) used.

The dicarboxylic acid component of this type of formulation may be characterized by a maximum ratio of unsaturated to saturated acid of 90 to 10 and a minimum ratio of 10 to 90 with a preferred range of between 75 to 25 and 25 to 75 respectively. The strongest cured films are obtained when the unsaturated acid content is greater than 50% of the total dicarboxylic acid component of the polyester.

In formulating unsaturated polyesters for present purposes, it is preferred to employ polyester resins containing allyl groups, however, compounds which do not contain ether linkages may be used to introduce allylic groups into the polyester molecule.

Among compounds useful in polyester structures which do not contain ether linkages are tetrahydrophthalic anhydride and endomethylene tetrahydrophthalic anhydride (Nadic).

Dicarboxylic acids illustrative of those often used in preparing unsaturated polyesters suitable for the purposes of this invention include maleic acid, fumaric acid, maleic anhydride, etc. Though maleic anhydride is, perhaps, preferred, other dicarboxylic acids substituted therefore in whole or in part include itaconic acid, citraconic acid, mesaconic acid, aconitic acid and the other less common dicarboxylic acids as mentioned in the polyester art.

Other dicarboxylic acids can be used in partial replacement for the unsaturated class described above, and included are phthalic anhydride, phthalic acid, Nadic anhydride, tetrahydrophthalic anhydride, etc.

Aromatic dicarboxylic acids and those of even greater acid functionality (mellitic anhydride), though containing double bonds in the nucleus, do not undergo addition reactions as do the preferred class of dicarboxylic acids (fumaric). From the above, and the state of the art, it is clear that mixtures of polyfunctional acids or their anhydrides are often employed to produce unsaturated polyester resins, and these modifications are generally useful for our purposes.

Ethylene glycol and diethylene glycol are most often selected as primary reactants with the foregoing polyfunctional acids to form useful polyesters. Obviously, however, other dihydric alcohols and polyhydric alcohols of greater functionality are known to be useful.

When polyfunctional modifiers are employed, illustratively, pentaerythritol, malic acid, etc., they may constitute from 5 to 12% of the total equivalents present in the polyester. The use of a polyfunctional modifier influences the ratio of acids chosen. For example, where pentaerythritol has been used as the polyfunctional modifier, the preferred acid ratio is often at about equal parts of fumaric acid and tetrahydrophthalic anhydride.

Esterification of the alcohol components present in the reactive mixture in the formation of unsaturated polyesters is carried out in the conventional manner at a temperature of from about 350° to 450° F. to an acid value of from 5 to 50. To compensate for loss of polyhydric alcohol component during processing, a small molar excess over theory of hydroxyl equivalents is included initially in the reaction at the rate of from 5 to 20 percent excess over stoichiometric hydroxyl equivalents. After the desired acid value has been reached, the mass is allowed to cool to a temperature at which it may safely be dissolved in styrene and/or other ethylenically unsaturated monomer(s). Compounds containing allyl ether groups may also be included at this point as part of the polyester solvent. The reduction of the polyester with monomer is often to the extent that the monomer constitutes from 20 to 50 percent by weight of the thinned polyester product. Ethylenically unsaturated monomers other than styrene may be used in the practice of this invention. Most frequently used are monomers containing reactive vinyl groups including vinyl toluene, dibutyl fumarate, diethyl maleate, 2-ethyl hexyl acrylate, diallyl phthalate, diallyl maleate, methyl methacrylate, acrylonitrile, vinyl pyrrolidone, divinyl spirobi, triallyl citrate, ethylene glycol dimethacrylate, etc.

It is known that unsaturated polyesters, including those heretofore described, cure through interpolymerization of the vinyl solvent with unsaturation in the polyester by means of free radical mechanisms in chain reactions. It is further known that free radical reactions may be induced to occur by one or all of three ways, namely; by light, by heat and under catalysis through a peroxide capable of forming free radicals originating through severance of a covalent bond.

In the field of this invention, which in its broad aspect relates to addition polymerization of ethylenically unsaturated monomers and polymers, combinations of heat and peroxide catalysts have heretofore been used.

Curing time of unsaturated polyesters is inversely proportional to the temperature so that it is desirable to operate at the highest temperature possible to achieve optimum production conditions and costs. However, other factors may dictate the curing temperatures to be used in a particular application. In the molding of polyesters in massive form, for example, the dissipation of heat is a problem because excessive heat may cause stresses and cracks in the molded article. Also in the hand lay-up method of making laminated structures by alternately overlaying and impregnating materials such as fiberglass cloth or mat with polyester resin over a form or mold, heat is detrimental because heat lowers the viscosity of the resin and increases the tendency to flow away from certain contours if mechanical means are not available to contain the flow. A similar problem exists in coating applications where the coated surface is not in a horizontal plane. Heat is also detrimental in coating applications where the surface or substrate to which the polyester is applied is sensitive to heat. Examples of such surfaces include wood, pressed vegetable fiber boards, leather, cloth, paper, etc.

Conventional catalyst systems are for the most part inoperable to cure polyester resins at low temperatures because of extremely long times to cure required. In some instances it is impossible to obtain a cure at room temperature. Catalysts most frequently used to effect the heat conversion of unsaturated polyester resins consist mainly of peroxide initiators. Peroxide initiators include benzoyl peroxide; 2,4-dichlorobenzoyl peroxide; methyl ethyl ketone peroxide; cyclohexanone peroxide; cumene hydroperoxide; bis(para-bromo benzoyl) peroxide; bis(phthalyl) peroxide; bis(acetyl) peroxide; tertiary-butyl hydroperoxide; ethyl peroxydicarbonate; di-isopropylene ozonide; peracetic acid, etc.

Other additives may be and normally are included with the initiator to increase pot life of unsaturated polyesters by inhibiting polymerization. One class of agents called Retardants accomplish this end by inhibiting or supressing free-radical formation. Illustrative of such retardants are hydroquinone, phenols, aromatic amines and antioxidants such as alpha-naphthol; resorcinol and sulfur compounds. A second class of agents, illustratively quinones and salts of substituted hydrazines, often referred to as Stabilizers are preferred over Retardants because the latter increase the pot life of the resin at room temperature but lose their retardant quality at elevated temperatures.

Special low temperature catalytic systems have been developed to cure polyester resins but their use necessarily results in polyesters having a short pot life, a deterrent factor in their commercial use. For low temperature curing, unsaturated polyester formulations usually employ, in addition to the aforementioned ingredients, a component which activates the peroxide initiator and promotes faster cure than would otherwise result at low temperature. Examples of activators used for this purpose include metallic driers, illustratively—cobalt naphthenate, oxides and hydroxides of barium, strontium, magnesium and calcium; phosphines; triethanolamine and isopropanolamine, etc.

Recently, light energy instead of or supplemental to heat has been used to accelerate free radical formation to increase the rate of polymer growth. Photopolymerization has made it possible to cure unsaturated polyesters at low temperatures, yet without shortening the pot life (time of retained fluidity) of the resin. Although light energy, especially in the ultraviolet range, has been known to be useful in polymerization of vinyl monomers, polymerization with light has only recently become practicable. Catalytic agents which increase the photosensitivity of polyesters are known. A photosensitizer of polymerization or photopolymerization catalyst absorbs light and with the energy so acquired dissociates into free radicals. Liberated free radicals have sufficient energy to initiate polymerization. Early photosensitizers were mercury in copolymerizing ethylene and butadiene; cadmium, ammonia, and uranium salts to polymerize ethylene; triethyl lead acetate, iron and chromium and aluminum salts to promote condensation of liquid monomers. Benzoyl peroxide, acetone, chloral hydrate and certain dyestuffs including azo compounds have been found effective to induce photopolymerization. Carbonyl compounds, including benzophenone and benzaldehyde, are reported to be active. Acyloins and organic compounds having a vicinal carbonyl group have been reported as active. Acyloin ethers have been reported as being more active than acyloins. Allyl hydroperoxide is said to be commercially feasible for such end use. Organic compounds having two or more halogens on the same carbon atom, hexachloroethanes, alkyl iodides in the presence of mercury and 2 position substituted naphthalenes, illustratively 2,7-dichloro-diphenylene sulfone, aryl and alkyl disulfides are reported photoactive, the aryl class said to possess higher activity.

Patents disclosing specific photochemically active catalysts include U.S. 2,236,736, 2,505,067, 2,505,068, 2,548,685, 2,579,095, 2,754,210, 2,809,182, 2,809,183, 2,951,758, etc. The foregoing prior art is incorporated herein to the same extent as though it were set out in full.

This invention is directed to synergistic combinations of photosensitizers providing improved means for curing unsaturated polyesters at low temperature. Each of the additives has been employed singly in the prior art as a photosensitizer for photopolymerization of organic compounds containing ethylenically unsaturated groups, especially vinyl monomers, illustratively, methyl methacrylate. Each has also been used alone in photopolymerization of unsaturated polyester resins. In U.S. Pat. 2,505,067 and 2,505,068, 1-chloromethyl naphthalene is said to catalyze the bulk polymerization of diethylene maleate and triethylene maleate with styrene. From 1 to 3% catalyst is added to the liquid polyester and a quartz mercury vapor lamp, four inches from the surface of the resin film, was used as the light source. U.S. Patent 2,579,095 discloses photopolymerization of tripropylene maleate or diethylene glycol maleate dissolved in styrene with 2-naphthalene sulfonyl chloride included to promote the reaction. Cures were attempted in bulk and in film form coated on wooden panels with sunlight as the source of light radiation. Identical experiments were carried out with 1% benzoyl peroxide and 1% 2-naphthalene sulfonyl chloride added to the polyester. However, inclusion of peroxide did not help to increase the rate of polymerization, but instead provided a slight deterrent to the rate.

Thus, prior art patents have disclosed that both 1-chloromethyl naphthalene and 2-naphthalene sulfonyl chloride singly function to catalyze photopolymerization of unsaturated polyesters. However, it was discovered that in combination reduced curing times were obtained over single catalyst use. In combination, faster curing cycles are obtained with air drying unsaturated polyester resins than are obtainable with each individual photosensitizer at a concentration equivalent to the combination.

Improvement in efficiency of the combined photosensitizers appears to be due to their synergistic mode of operation. The 2-naphthalene sulfonyl chloride appears to initiate polymerization first at the substrate and progress upwardly while 1-chloromethylnaphthalene initiates curing at the air-polyester top interface and proceeds downwardly.

As polymerization appears initiated from opposite surface areas and takes place in opposite directions, the influence thereof is more than additive and the curing cycle under light is significantly shortened and superior films result.

Appearance, too, of the cured polyester is improved by employing the photosensitizers in combination. Each possesses an inherent disadvantage potentially detrimental to the quality of the cured product. Specifically, 2-naphthalene sulfonyl chloride alone contributes an objectionable pink color to the polyester. 1-chloro-methyl naphthalene alone often causes wrinkling.

In combining 1-chloromethyl naphthalene and 2-naphthalene sulfonyl chloride to provide a system of photosensitizers, distinct advantages are gained in that less of each photosensitizer is used overcoming the inherent disadvantages of each alone.

For best results, the minimum concentration of the combined photosensitizer to be used is 0.5% and the maximum concentration is 5% with a preferred range of from 1 to 3%.

At a concentration of 0.5 to 1.5%, the optimum range for each photosensitizer component, the appearance of the cured resin film does not evidence unwanted side effects, or if in evidence, not to an objectionable level.

It has also been found that a photosensitizer for rapidly curing polyester coatings under the influence of light energy may be obtained by combining 1-chloromethylnaphthalene and 2-chloroanthraquinone. An inherent disadvantage of using 2-chloroanthraquinone solely as photosensitizer for polyester coatings is its poor solubility in these materials at the level indicated. However, when used in combination with 1-chloromethylnaphthalene, poor solubility is not a disadvantage because very low concentrations of 2-chloroanthraquinone is required to provide photosensitizer activity.

For best results, the minimum concentration of this combination of photosensitizers to be used is 0.3% and the maximum concentration is 3% with a preferred range of from 0.6 to 2.0%.

Optimum concentration for the chloromethyl naphthalene component is from 0.5 to 1.7% and for 2-chloroanthraquinone optimum concentration is from 0.1 to 0.3%.

The primary end use of this invention has been for protective and decorative coatings and the synergistic combination of photosensitizers used in this invention are particularly useful as photopolymerization catalysts for air drying unsaturated polyesters in film form. Accordingly, the description and examples of this specification are directed to protective films, but it is not intended thereby to restrict application of the invention to the coatings field.

In utilizing photopolymerization of unsaturated polyesters catalyzed with the foregoing synergistic combination of photocatalytic agents for coating wood and other substrates, it is desirable that the substrate surfaces are primed beforehand.

Metal substrates do not require a primer but polyester resins deposited as films on wood or pressed wood fiber board, etc. tend to form air bubbles and cure is inhibited. Primers provide a preferred method of overcoming these latent defects. Primers of the lacquer type are preferred because they dry principally by solvent evaporation and are particularly adaptable to fast production schedules. Slower drying primers may be used, illustratively those containing drying oils which dry primarily by oxidation, so long as they effectively seal and separate the substrate from the polyester coating. Primers may either be clear or pigmented.

In the preferred practice of this invention, a primer is employed for non-metal substrates, usually of the lacquer class containing a resin or binder which dries by solvent evaporation. Nitrocellulose and solvent solutions of the vinyl polymer class (Vinylite VAGH) in solution have been used as the binder phase. These primers sometimes contain an organic peroxide, for example, methyl ethyl ketone peroxide, cyclohexanone peroxide, etc., and when so formulated are referred to herein as "active ground coats." From 1% to about 9% of organic peroxide by weight of the primer are used in active ground coats.

To be operable as an activator for active ground coats, the organic peroxide selected should be soluble in the solvents in which the film forming solids are dissolved. It is desirable for effective operation of the active ground coat that the peroxide selected has decomposition qualities suitable to the end use. After the active ground coat has been applied and before the application of the polyester topcoat, active ground coats are exposed to air-drying to flash off solvent. Thereafter, the polyester coating may be applied immediately but preferably within a week to obtain best results. Active ground coat and unsaturated polyester topcoat appear not to mix but the fact that the cure time of the coating is shortened by an active ground coat and that co-action occurs is demonstrated in the examples which follow.

After the unsaturated polyester coating has been applied over a substrate primed with an active ground coat, intermediate heat treatment is often provided and is effective to reduce the time required for final curing of the film by light radiation. Heat treatment promotes escape of entrapped air and solvents and may initiate decomposition of the peroxide catalyst. Pre-heating may occur during a 5 to 15 minute interval at temperatures of from 140° to 250° F. Preferred procedures for heat treatment prior to irradiation are given below.

TABLE I

| | Method | Temp., °F. | Time, min. | Temp. of Panel Core |
|---|---|---|---|---|
| (1) | Air flash | 77 | 5 | 77° F. |
| | Oven bake | 200 | 5 | Reaches 145° F. |
| (2) | Heat applied to bottom of panel. | 250 | 5-8 | Reaches 150-173° F. |

The polyester top coating is cured by irradiating it with light energy from a light source having a major percentage of its total energy output within a select wave length range. Optimum results are obtained when the spectral output of the light source is correlated with the absorption characteristics of the photosensitizer additives.

1-chloromethyl naphthalene and 2-naphthalene sulfonyl chloride each absorb light energy in the near ultraviolet and within a wave length range between about 2900 A. and 4000 A. with a substantial portion in the 2900 to 3200 A. range.

The R.S. sunlamps and Mercury Vapor Photochemical Lamp H85C3 provide excellent light sources for this purpose as these lights have peak output within the desired wave length range. Type R.S. sunlamp is recommended, however, because physical specifications of this source are such to allow effective use of its light energy output. The greater the intensity and concentration of the light radiation on the polyester-catalyst combination, the more rapid the photopolymerization of the unsaturated polyester, photosensitized as described above.

To obtain the greatest efficiency from the light source, it should be placed conveniently close to the surface to be cured. For example, Type R.S. sunlamp radiates a considerable quantity of heat, so that the distance between the lamps and the coated surface must be considered. One may maintain a rate of air flow to cool the light source and coated surface to within the practical range. Exemplary operating temperatures were recorded after exposing a wooden panel coated with unsaturated polyester for ten minutes to the radiation from three type R.S. sunlamps at a distance of 10 inches.

Table II

Ambient temp. (under lamp), °F. ---------- 105-140
Panel interior temp., °F. ------------------ 145-150
Film surface temp., °F. -------------------- 115-135

Where heat emitted from the Type R.S. sunlamp is excessive, Mercury Vapor Lamps may be substituted. Mercury Vapor Lamps have the same spectral output, but do not generate as much heat. Such lamps do not emit the same energy per unit area for a given input as do the sun lamps. Optimum distance of light source from surfaces to be cured is within a preferred range of between 3 and 15 inches. Beyond 24 inches, the radiant energy level is not practical for photopolymerization.

The following examples are illustrative of useful air drying unsaturated polyesters. They are illustrative only, and are not exhaustive of the term "air drying unsaturated polyester resin" as the term is intended.

EXAMPLE I

Preparation of 20% allyl glycidyl ether diethylene maleate phthalate.

|  | Weight gm. |
|---|---|
| (I) Maleic anhydride | 1599 |
| (II) Phthalic anhydride | 805 |
| (III) Diethylene glycol | 2030 |
| (IV) Allyl glycidyl ether | 546 |
| (V) Dimethylbenzylamine | 6.13 |
| Total charge | 4986.13 |

Ingredients I, II and III were charged to a 2 gallon kettle and heated gradually to 360° F. with agitation. A $CO_2$ blanket was introduced upon initial heating and the blanket and agitation maintained throughout. The temperature of the batch was held at 360° F. for 3 hours, raised to 392° F. and held at that temperature for an acid value of the solids of 70-73. Heating was cut and the batch cooled to 240° F. Upon reaching 240° F., ingredients IV and V were added slowly over a period of 30 minutes. Carbon dioxide was not used as a blanket during the addition, but was resumed after addition was completed. One half hour after all the monomer had been added, the $CO_2$ blanket was charged to a $CO_2$ blow of about 0.04 cubic foot per minute. The batch was held at 240° F. to 250° F. for an acid value of 18–20, the resulting exothermic reaction causing the temperature of the batch to reach 250° F.

Cures were frequently taken during the holding period to guard against overpolymerizing or jelling the batch. The minimum cure value allowed before cooling and reducing the batch was 4–5 seconds. After completing the reaction, the resin was reduced with styrene to produce a resin solution containing 75% polyester resin and 25% styrene. To inhibit unwanted reaction, 100 p.p.m. tertiary-butyl hydroquinone based on the total resin-styrene blend was added. The final styrene-resin dispersion had a viscosity of U–V and an acid value of 19.

EXAMPLE II

Preparation of 30% diallyl P.E. (pentaerythritol) diethylene maleate phthalate

| | Weights gm. |
|---|---|
| (I) Maleic anhydride | 441 |
| (II) Phthalic anhydride | 222 |
| (III) Diethylene glycol | 490 |
| (IV) Diallyl P.E. | 428 |
| (V) Sulfonated styrene-divinyl benzene polymer (Dowex 50) | 14.6 |
| Total charge | 1595.6 |

Ingredients I, II and III were charged to a 3 liter flask fitted with a water cooled reflux condenser and heated gradually to 360° F. with agitation. 86 grams of toluene were added for refluxing and a light nitrogen blanket was introduced and maintained throughout the reaction. The temperature was held at 360° F. After the acid value had dropped to 141–142, ingredients IV and V were added. The batch was reheated to 360° and held for a final acid value of 37–39. At a late stage in the reaction the azotrope solvent (toluene) was removed by blowing with nitrogen. At an acid value of 37–39, the polyester resin was cooled and reduced with styrene to produce a final solution of 75% resin and 25% styrene. The final resin had an acid value of 38.6 and a viscosity of W—. Tertiary butyl hydroquinone was added as inhibitor at a concentration of 100 parts per million based on the weight of the total solution.

EXAMPLE III

Preparation of 30% diallyl P.E. ethylene maleate phthalate

| | Weights gm. |
|---|---|
| (I) Maleic anhydride | 441 |
| (II) Phthalic anhydride | 222 |
| (III) Ethylene glycol | 285 |
| (IV) Diallyl P.E. | 428 |
| (V) Sulfonated styrene-divinylbenzene polymer (Dowex 50) | 12.7 |
| Total charge | 1388.7 |

This resin was prepared in the same manner as Example II except that the addition of IV and V was made at an acid value of 173–176. The completed resin was reduced with styrene to produce a resin solution containing 25% styrene and 75% polyester resin. The final resin solution had a viscosity of $Z_1^+$ and an acid value of 37.4.

EXAMPLE IV

Preparation of TMP (trimethylolpropane) monoallyl ether diethylene maleate phthalate.

| | Weights g. |
|---|---|
| (I) Maleic anhydride | 588 |
| (II) Phthalic anhydride | 296 |
| (III) Diethylene glycol | 746 |
| (IV) TMP monoallyl ether | 306 |
| Total charge | 1936 |

Ingredients I, II and III were charged to a 3 liter flask fitted with a water cooled reflux condenser and heated gradually to 360° F. with agitation. 67 grams of toluene was added for refluxing and a light nitrogen blanket was introduced and maintained throughout the reaction. The batch was held at 360° F. for an acid value of 100 and the addition of ingredient IV. Upon the addition of IV, the batch was reheated to 360°–392° F. and refluxing continued until in the late stage of the reaction of the azeotropic solvent (toluene) was removed by blowing with nitrogen. Temperatures of 360°–392° F. were held for a final acid value of 20–22 and a minimum cure of 4 seconds. The completed resin was reduced with styrene in the same proportions as in the previous examples. The reduced resin had a viscosity of $Z_1$ and an acid value of 21.2.

EXAMPLE V

Preparation of diethylene fumarate tetrahydrophthalate.

| | Weights gm. |
|---|---|
| (I) Tetrahydrophthalic anhydride | 570 |
| (II) Fumaric acid | 1305 |
| (III) Diethylene glycol | 1670 |
| Total charge | 3545 |

All the ingredients were charged to a 5 liter flash fitted with a water cooled reflux condenser and heating and agitation started. After 1 hour and at 320° F., 177 grams of xylol were added for refluxing. A light nitrogen blanket was introduced. Over the next hour the temperature was increased to 360° F. At the beginning of the third hour, the temperature was again raised slowly to 392° F. and held for an acid value of 20. Xylene was removed at a later stage of the reaction by blowing with nitrogen. After the acid value of the batch had been reduced to about 20, it was reduced with styrene to a viscosity of U and a polyester resin solids content of 70%. Tertiary-butyl hydroquinone was added as inhibitor at a concentration of 100 parts per million of resin solution by weight.

The following examples are illustrative of the invention in its preferred embodiment, demonstrating its advantages in comparison with prior art methods.

Example VI illustrates the improvement when two photosensitizers are used in combination, rather than either one alone at equivalent concentration.

EXAMPLE VI

The unsaturated polyester of Example I was reduced with styrene to increase the styrene content to 46.4%. Five aliquot portions were withdrawn after minor additions to increase flow and a different photosensitizing agent was added to each aliquot portion (see Table III). Each of the polyester coatings were coated on alphabetically identified wooden panels prepared with an active ground coat as a primer deposited from a solution of a vinyl chloride-vinyl acetate copolymer. Vinylite VAGH containing approximately 3.9% of methyl ethyl ketone peroxide. Each of the coated panels were aged for five minutes at room temperature and then pre-heated at 200° F. for 5 minutes. Following heating, the coating surface of each panel was placed 10 inches from a battery of three R.S. Sunlamps and cured as indicated in Table III. An electric fan was used to control temperatures which varied between 118° F. and 123° F. at the coated surface of the panel.

TABLE III

| Sample | Sensitizers | Tack-free, min. | Cure, min. | Mar Resistance |
|---|---|---|---|---|
| A | 1% 1-chloromethylnaphthalene | 10 | 25 | Excellent. |
| B | 1% 2-naphthalene sulfonyl chloride | 22 | 22 | Fair. |
| C | 1% 1-chloromethylnaphthalene<br>1% 2-naphthalene sulfonyl chloride | 7 | 11 | Good–Excellent. |
| D | 2% 1-chloromethylnaphthalene | 9 | 17 | Very Good. |
| E | 2% 2-naphthalene sulfonyl chloride | 7 | 16 | Fair. |

To demonstrate that variations in temperature were not responsible for the differences in curing time and mar resistance reported in Table III, a similar primed panel was coated with sample C and baked at 140° F. for one hour. The coating remained in an ungelled condition, indicating no appreciable curing thereof.

EXAMPLE VII

A portion of the polyester prepared and reduced with styrene according to Example II was divided into eight aliquot parts after minor additions to increase flow. Styrene was added to each aliquot portion to increase the styrene content to the level shown in Table IV. Photosensitizing agents were also added to each sample, as indicated in the table. Each fluid sample was spread as a coating on separate steel panels pre-primed with an active ground coat deposited from a solution of Vinylite VAGH containing 3.9% of methyl ethyl ketone peroxide. Each panel in the test series was subjected to heat pre-treatment and thereafter irradiated under the three lamp type R.S. Sunlamp light source described in Example VI. Time required under irradiation to produce a cure and hardness of the film after coating are recorded in Table IV. The hardness of the cured film was measured by the Sward Rocker Hardness Tester. Values obtained are correlated to the extent of cure of the film of polyester on the test panel.

EXAMPLE IX

Blends of photosensitizing catalytic agents consisting of 1% of chloromethyl naphthalene and 1% naphthalene sulfonyl chloride were added to a series of samples of aliquot portions of a resin solution prepared according to Examples I through V. Styrene was used to reduce these resins in the proportions shown in the second column of Table VI. Flow control agents were present in the test resins. Portions of each aliquot sample were coated in a corresponding series of wooden test panels, the faces of which were primed with an active ground coat and pre-treated as in (Example VI). The test series, coated with the corresponding aliquot samples were exposed to a light source where light intensity and the temperatures prevailing during irradiation were held under the same conditions described in Example VI.

TABLE VI

| Resin | Percent Styrene | Tack-free Time, min. | Cure Time, min. | Mar Resistance |
|---|---|---|---|---|
| Ex. I | 46.4 | 3 | 11 | Good–Excellent. |
| Ex. II | 46.4 | 2 | 7–9 | Excellent. |
| Ex. III | 46.4 | 2 | 7 | Do. |
| Ex. IV | 46.4 | 6 | 9 | Do. |
| Ex. V | 42–50 | 3–4 | 9–10 | Fair–Excellent. |

TABLE IV

| Sample | Sensitizers | Percent Styrene | Tack Free Time, min. | Cure Time, min. | Sward Hardness Overnight–1 week later |
|---|---|---|---|---|---|
| F | None | 44.4 | 17 | 28 | 12–11.6 |
| G | 1% 2-naphthalene sulfonyl chloride | 44.4 | 2 | 10 | 3–5 |
| H | 2% 2-naphthalene sulfonyl chloride | 46.4 | 2 | 7 | 7.5–7.2 |
| I | 1% 1-chloromethyl naphthalene | 44.4 | 3 | 9 | 6.8–7.4 |
| J [1] | 2% 1-chloromethyl naphthalene | 46.4 | 2 | 9 | 11.2–12.6 |
| K | 0.5% 1-chloromethyl naphthalene<br>0.5% 2-naphthalene sulfonyl chloride | 44.4 | 2 | 11 | 8.2–8 |
| L | 1% 1-chloromethyl naphthalene<br>1% 2-naphthalene sulfonyl chloride | 46.4 | 2 | 7–8 | 11–11 |
| M | 1% 1-chloromethyl naphthalene<br>1% 2-naphthalene sulfonyl chloride | 44.4 | 2 | 7 | 12–11.7 |

[1] Sample J had a slight aftertack, and was wrinkled. This defect is illustrative of one disadvantage of using chloromethyl naphthalene alone.

EXAMPLE VIII

Another combination of photosensitizers was tested using the same polyester resin reduced to 53.6% resin with styrene and in similar manner to Example VII, except that wood panels were employed. The photosensitizers, the amounts employed and the results are shown in Table V.

In the following examples, general purpose polyesters are used which have been made air drying or non-air inhibited by adding monomers containing allyl groups to the resin subsequent to initial polymerization. This procedure differs from the method of preparing the resins used in the previous examples. There the monomers containing allyl groups were included as a part of the reac-

TABLE V

| Sample | Sensitizers | Tack-free Time, min. | Cure Time, min. | Mar Resistance |
|---|---|---|---|---|
| N | 0.2% 2-chloroanthraquinone | 17 | 33 | Good. |
| O | 1% 1-chloromethyl naphthalene | 10 | 25 | Excellent. |
| P | 1% 1-chloromethyl naphthalene<br>0.2% 2-chloroanthraquinone | 7 | 11 | Fair–Good. | tants esterified in the preparation of the unsaturated polyester resin solids.

EXAMPLE X

Seven aliquot portions of the polyester resin of Example III were removed after minor additions to increase flow and sufficient styrene was added to each portion to increase the styrene content to 42%. Photosensitizers were then added to each sample as indicated in Table VII.

Each liquid sample was coated on an alphabetically identified wood panel which had been pre-primed with an active ground coat deposited from a solution of Vinylite VAGH containing 3.9% of methyl ethyl ketone peroxide. The freshly coated panels were aged at room temperature for five minutes before baking at 200° F. for five minutes. Following baking, the coated panels were placed under the type R.S. Sunlamps at a distance 10 inches from the lamps. The temperature under the lamps was approximately 118–121° F. Table VII shows the duration of irradiation for each coating and the condition of the cured coating film.

TABLE VII

| Sample | Sensitizers | Tack-free Time, min. | Cure Time, min. | Film Appearance |
|---|---|---|---|---|
| Q | 0.5% 1-chloromethyl naphthalene | 7 | 15 | Smooth film. |
| R | 1.0% 1-chloromethyl naphthalene | 3 | 11 | Wrinkled. |
| S | 0.1% 2-chloroanthraquinone | 18 | 30 | Good film, no color. |
| T | 0.2% 2-chloroanthraquinone | 13 | 20 | Do. |
| U | 0.5% 2-chloroanthraquinone | 3 | 8 | Definitely yellow. |
| V | {0.1% 2-chloroanthraquinone / 0.5% 1-chloromethyl naphthalene} | 4 | 9 | No color, no wrinkling. |
| W | {0.2% 2-chloroanthraquinone / 1.0% 1-chloromethyl naphthalene} | 4 | 10 | Do. |
| X | {0.5% 2-chloroanthraquinone / 1.0% 1-chloromethyl naphthalene} | 2 | 7 | No wrinkling, definitely yellow. |

EXAMPLE XI

A general purpose commercial polyester, a propylene-maleate-phthalate was divided into two equal portions. To one portion 10% of the triallyl ether of pentaerythritol was added and thoroughly mixed. An equal amount of blend of photosensitizing catalytic agents consisting of 1% of chloromethyl naphthalene and 1% naphthalene sulfonyl chloride was added to each portion. Panel preparation and light exposure followed similar procedures to those of Example IX.

The general purpose resin used alone remained tacky after one-half hour of light exposure. In contrast, the portion of the general purpose resin to which the triallyl ether of pentaerythritol had been added cured to a tack-free film in 19 minutes.

EXAMPLE XII

Preparation of a polymer of allyl glycidyl ether.

570 grams of allyl glycidyl ether was charged to a flask equipped with an agitator. Boron trifluoride catalyst (2.85 gm.) was added dropwise with agitation at room temperature. The polymerization reaction which followed occurred through the reaction of epoxide groups and was accompanied by the evolution of heat. After heat from the exothermic reaction had dissipated, the temperature of the batch was raised to 220° F. This temperature was held for 22 hours after which 5.7 grams of boron trifluoride catalyst was again added.

Temperature was held at 220° F. for 22 hours subsequent to boron trifluoride addition, whereupon the reaction was terminated. The epoxide value of the final product indicated that 64.8% of the epoxide groups present had reacted.

EXAMPLE XIII

The polymer of allyl glycidyl ether of Example XII was added to the following unsaturated poyester resins.

Resin A:
    Polyester Resin by weight _____percent__ 70
    Vinyl monomer (styrene) by weight ___do____ 30

Total _____ 100

Composition of Polyester Resin:
    Diethylene glycol _____mole__ 1.05
    Propylene glycol _____do____ 1.05
    Maleic anhydride _____do____ 1.0
    Nadic anhydride _____do____ 1.0

Resin B:
    Polyester Resin by weight _____percent__ 70
    Vinyl monomer (styrene) by weight ___do____ 30

Total _____ 100

Composition of Polyester Resin:
    Diethylene glycol _____mole__ 1.05
    Propylene glycol _____do____ 1.05
    Maleic anhydride _____do____ 0.8
    Nadic anhydride _____do____ 1.2

The polymer of allyl glycidyl ether was added to Resin A and Resin B at various levels as indicated in Table VII. One percent each of the combined photosensitizers, 1-chloromethyl naphthalene and 1-naphthalene sulfonyl chloride was added to each sample and mixed well.

TABLE VIII

| Sample | Resin A | |
|---|---|---|
| | Percent Polymer Added | Tack-free Time, min. |
| 1 | 0 | 60 |
| 2 | 2.5 | 41–70 |
| 3 | 5.0 | 41–70 |
| 4 | 7.5 | 50 |
| 5 | 10.0 | 30 |
| 6 | 12.5 | 31 |
| 7 | 15.0 | 41 |
| | Resin B | |
| 8 | 0 | 60 |
| 9 | 2.5 | 53 |
| 10 | 5.0 | 53 |
| 11 | 7.5 | 32–42 |
| 12 | 10.0 | 32–42 |
| 13 | 12.5 | 32 |
| 14 | 15.0 | 20–32 |

After the catalyst was added, each of the above samples was coated on unprimed wood panels at an average film thickness of about 10 mils. The coated panels were irradiated under a light source consisting of *one* 275 watt R.S. Sunlamp until tack-free. Samples 1 and 8 retained some tack after one hour under the sunlamp. The temperature range at the coating during irradiation was from 84° F. to 126° F. Samples 1 and 8, the controls, reached a maximum temperature of 140° F.

EXAMPLE XIV

A portion of the unsaturated polyester resin of Example I was reduced with styrene to increase the total styrene content to 46.4%. 1-chloromethyl naphthalene and 2-naphthalene sulfonyl chloride were added to the reduced resin at a level of 1% for each photosensitizer. This catalyzed unsaturated polyester was used to coat the three wooden panels prepared as shown in Table IX. Light radiation, as described in Example VI, was begun after the coated panels had aged at room temperature for approximately 60 minutes.

The results shown in Table IX indicate that the polyester film coated on the unprimed panel, B-2, was only partially cured and soft. This film, however, became completely cured after aging for several hours. Results indicate that curing does not always cease after light treatment but may continue more slowly on aging at room temperature until a complete cure is obtained.

TABLE IX

| Panel No. | Primer | Total Light Exposure, min. | Results |
|---|---|---|---|
| A-2 | Active ground coat [1] | 9 | Film hard. |
| B-2 | Regular primer [2] | 12 | Film softer than A-2. |
| C-2 | No primer | 10 | Very cheesy film, film contains air bubbles. |

[1] Vinylite VAGH solution containing approximately 3.9% methyl ethyl ketone.
[2] Vinylite VAGH solution.

As shown in Table VIII, the tack-free time was decreased by adding increasing amounts of the allyl glycidyl ether polymer. Several film properties were best for the samples containing between 2.5% and 10% of the polymer.

What I claim is:

1. A method of rapidly curing an unsaturated polyester resin which comprises the steps of mixing with an unsaturated polyester resin from 0.5% to 5% of a photosensitizer consisting of a mixture of from 25% to 75% of 1-chloromethyl naphthalene and from 75% to 25% of 2-naphthalene sulfonyl chloride and irradiating said polyester resin-photosensitizer mixture with light radiation from a light source emitting a substantial proportion of its total light energy output in the 2900 to 4000 angstrom wavelength range until the polyester resin becomes cured.

2. A method of rapidly curing an unsaturated polyester resin which comprises the steps of mixing with an unsaturated polyester resin from 0.3 to 3.0% of a photosensitizer consisting of a mixture of from 40% to 98% of 1-chloromethyl naphthalene and from 2% to 60% of 2-chloroanthraquinone and irradiating said polyester resin photosensitizer mixture with light radiation from a light source emitting a substantial proportion of its total energy output in the 2900 to 4000 angstrom wavelength range until the polyester resin becomes cured.

3. A method of coating a substrate with a cured unsaturated polyester resin film which comprises the steps of intimately mixing from 0.5% to 5.0% of a photosensitizer consisting of from 25% to 75% of 1-chloromethyl naphthalene and from 75% to 25% of 2-naphthalene sulfonyl chloride with an air drying polyester resin containing active allyl groups, depositing a wet film of the resulting mixture on the substrate to be coated and irradiating said deposited wet film with light radiation from a light source emitting a substantial proportion of its total light energy output in the 2900 to 4000 angstrom wavelength range until the polyester resin coating becomes cured.

4. The method according to claim 3 wherein the substrate to be coated with the unsaturated polyester is prepared for coating by priming with an active ground coat containing from about 1% to 9% of an organic peroxide by weight of the active ground coat.

5. The method according to claim 4 wherein the active ground coat and unsaturated polyester topcoat are treated prior to light irradiation by heating to temperatures of from about 140° F. to 250° F. for from about 5 to 15 minutes to aid in removal of trapped air and solvents and in the decomposition of the organic peroxide.

6. An unsaturated polyester resin composition for curing with light irradiation which comprises an unsaturated polyester resin and from 0.5 to 5% of a photosensitizer consisting of from about 25% to 75% of 1-chloromethyl naphthalene and from about 75% to 25% of 2-naphthalene sulfonyl chloride.

7. An unsaturated polyester resin coating composition for curing with light irradiation which comprises an unsaturated polyester resin containing active allyl groups and from 0.5 to 5% of a catalyst mixture consisting of from about 25% to 75% of 1-chloromethylnaphthalene and from 75% to 25% of 2-naphthalene sulfonyl chloride.

References Cited

UNITED STATES PATENTS

| 2,505,067 | 4/1950 | Sachs | 204—159.23 |
| 3,008,242 | 11/1961 | Sites et al. | 117—93.31 |
| 3,052,568 | 9/1962 | Sites et al. | 117—62 |

MURRAY KATZ, *Primary Examiner.*

UNITED STATES PATENT OFFICE
CERTIFICATE OF CORRECTION

Patent No. 3,326,710　　　　　　　　　　　　　　　　June 20, 1967

Mary G. Brodie

It is hereby certified that error appears in the above numbered patent requiring correction and that the said Letters Patent should read as corrected below.

Column 3, line 8, for "3,006,878" read -- 3,006,876 --; column 5, line 60, for "2,236,736" read -- 2,326,736 --.

Signed and sealed this 15th day of October 1968.

(SEAL)
Attest:

Edward M. Fletcher, Jr.　　　　　　　　　　　　　　EDWARD J. BRENNER
Attesting Officer　　　　　　　　　　　　　　　　　Commissioner of Patents